United States Patent
Song et al.

(10) Patent No.: US 11,467,552 B2
(45) Date of Patent: Oct. 11, 2022

(54) DECENTRALIZED PLANNING, SCHEDULING AND CONTROL OF MULTI-AGENT FLOW CONTROL SYSTEM

(71) Applicant: SIEMENS CORPORATION, Selin, NJ (US)

(72) Inventors: Zhen Song, Plainsboro, NJ (US); Xiaofan Wu, Maple Shade, NJ (US); Sanjeev Srivastava, Princeton Junction, NJ (US); Shaili Nepal, Charlottesville, VA (US)

(73) Assignee: Siemens Corporation, Iselin, NJ (US)

( * ) Notice: Subject to any disclaimer, the term of this patent is extended or adjusted under 35 U.S.C. 154(b) by 69 days.

(21) Appl. No.: 16/630,275

(22) PCT Filed: Apr. 3, 2018

(86) PCT No.: PCT/US2018/025877
§ 371 (c)(1),
(2) Date: Jan. 10, 2020

(87) PCT Pub. No.: WO2019/018015
PCT Pub. Date: Jan. 24, 2019

(65) Prior Publication Data
US 2020/0166902 A1    May 28, 2020

Related U.S. Application Data

(60) Provisional application No. 62/533,718, filed on Jul. 18, 2017.

(51) Int. Cl.
*G05B 19/042*    (2006.01)
*G05B 13/04*    (2006.01)
(Continued)

(52) U.S. Cl.
CPC ......... *G05B 19/042* (2013.01); *G05B 13/042* (2013.01); *G06F 11/0715* (2013.01);
(Continued)

(58) Field of Classification Search
None
See application file for complete search history.

(56) References Cited

U.S. PATENT DOCUMENTS 5,248,577 A * 9/1993 Jerome .................. G05D 21/02
                                                       23/295 R
9,746,199 B1 * 8/2017 Drees ....................... F24F 11/76
(Continued)

FOREIGN PATENT DOCUMENTS

KR    1020100098707    9/2010
KR    1020120132510    12/2012
(Continued)

OTHER PUBLICATIONS

PCT Search Report dated Dec. 11, 2018, for PCT Application No. PCT/US2018/025877, 10 pages.
(Continued)

*Primary Examiner* — Ryan D. Coyer

(57) ABSTRACT

Systems and methods are provided for generating a flow control plan for a plurality of components in a flow control system. A decentralized multi-agent control framework is used to plan and schedule for each agent independently without a central processor. Each agent of the multi-agent control framework separately optimizes a local portion of the system as a function of values for one or more parameters. Agents communicate with other connected agents, sharing values for parameters. The communication provides a negotiation and consensus for values of the shared parameters that are used by the agent to recalculate optimized parameters values for the local portion of the system.

13 Claims, 5 Drawing Sheets

(51) Int. Cl.
    *G06F 11/07*     (2006.01)
    *G06Q 10/04*     (2012.01)
    *G06Q 50/16*     (2012.01)
    *G06Q 50/06*     (2012.01)

(52) U.S. Cl.
    CPC ...... *G06F 11/0751* (2013.01); *G06F 11/0793* (2013.01); *G06Q 10/04* (2013.01); *G06Q 50/163* (2013.01); *G05B 2219/25011* (2013.01); *G05B 2219/2625* (2013.01); *G06Q 50/06* (2013.01)

(56) References Cited

U.S. PATENT DOCUMENTS

| | | | |
|---|---|---|---|
| 2007/0233626 A1 | 10/2007 | Bradley et al. | |
| 2009/0114284 A1* | 5/2009 | Siivonen | F15B 11/0426 137/1 |
| 2013/0167560 A1* | 7/2013 | Wong | G05B 15/02 62/56 |
| 2015/0119050 A1 | 4/2015 | Wei-Cheng et al. | |
| 2015/0377936 A1* | 12/2015 | Ghosh | G01R 21/133 702/60 |
| 2015/0379542 A1* | 12/2015 | Lian | G06Q 30/0206 705/7.35 |
| 2016/0054712 A1* | 2/2016 | McFarland | G05B 13/04 700/275 |
| 2017/0040839 A1* | 2/2017 | Srivastava | H02J 3/381 |
| 2018/0238575 A1* | 8/2018 | Park | F24F 11/54 |

FOREIGN PATENT DOCUMENTS

| | | |
|---|---|---|
| KR | 1020160107359 | 9/2016 |
| WO | 2015164292 | 10/2015 |
| WO | 2015164292 A1 | 10/2015 |

OTHER PUBLICATIONS

Scheidt, David H.; "Intelligent Agent-Based Control" in: Johns Hopkins APL Technical Digest, vol. 23, No. 4 (2002); pp. 383-395, 13 pages.

Song, Zhen et al.: "A Resilience Metric and its Calculation for Ship Automation Systems" 978-1-5090-2002-7/16/$31.00; IEEE; pp. 194-199, 6 pages.

Qiao, Bing et al.: "A Multi-Agent System for Building Control" in: IEEE Computer Society; Proceedings of the IEEE/WIC/ACM International Conference on Intelligent Agent Technology (IAT'06); 0-7695-2748-5/06, 7 pages.

McArthur, Stephen D. J. et al.: Multi-Agent Systems for Power Engineering Applications—Part I: Concepts, Approaches, and Technical Challenges in IEEE Transactions on Power Systems, vol. 22, No. 4; pp. 1743-1752, 10 pages.

Boyd et al;"Distributed Optimization and Statistical Learning via the Alternating Direction Method of Multipliers" Foundations and Trends in Machine Learning; vol. 3; No. 1; p. 1-122; ISSN: 1935-8237; DOI: 10.1561/2200000016; XP055127725, 125 pages.

Fang, Ruixian et al.: "Thermal Modeling and Simulation of the Chilled Water System for Future All Electric Ship"; 978-1-4244-9273-2/11/$26.00, pp. 265-271, 7 pages.

Notice of Allowance dated Jan. 28, 2022, for Korean Application No. 10-2020-7004479, 6 pages.

* cited by examiner

DECENTRALIZED PLANNING, SCHEDULING AND CONTROL OF MULTI-AGENT FLOW CONTROL SYSTEM

CROSS REFERENCE TO RELATED APPLICATIONS

This application claims the benefit of U.S. Provisional Application No. 62/533,718, filed Jul. 18, 2017, which is hereby incorporated by reference in its entirety.

FIELD

Embodiments relate to a decentralized flow control system, such as a control system for water distribution.

BACKGROUND

Flow control systems are commonly used in many different research or application environments, including process control, power networks, auxiliary systems, and water systems, among others. Flow control is used in a wide variety of industrial applications including power generation, petrochemicals, food processing, and manufacturing. The primary objective of a flow control system is to guarantee stability, energy efficiency, and good performance during operation of the system.

For example, liquid and gas variables such as flow rate, pressure, temperature, liquid level, and density are to be controlled precisely. In many systems, one of the important and basic parameters is flow rate control. This flow rate can be for anything i.e. water, steam, petrol, diesel, gas, etc. Maintaining desired flow rate is desired for smooth running of the process as well as for better quality results.

For a water flow system, the goal of a flow control system is to obtain real and reactive flow data on each branch to distribute water flow to different locations. In a ship water system, for example, water flows are optimally dispatched to provide sufficient coolants to the critical loads to reduce energy losses and, most importantly, to avoid malfunction and breakdown of the machinery system resulted from overheating. In a water system of a building, the challenge is to maximize the cooling requirements while keeping energy costs to a minimum.

SUMMARY

By way of introduction, the preferred embodiments described below include methods and systems for decentralized planning, scheduling, and control of a multi-agent flow control system.

In a first aspect, a decentralized flow control system is provided including a plurality of components for carrying out local flow control tasks. Each of the plurality of components includes at least one mechanical element configured to adjust one or more flows, at least one sensor configured to detect the one or more flows, at least one actuator configured to mechanically adjust the at least one of the mechanical element, a communication interface configured to communicate with at least one other component of the plurality of components, and a component processor. The component processor is configured to calculate a local optimized flow plan based on data from the at least one sensor, communicate the local optimized flow plan to at least one other component of the plurality of components to negotiate an optimized system flow plan with the other component of the plurality of components, and implement the optimized system flow plan though the at least one actuator.

In a second aspect, a method is provided for generating a flow control plan by a plurality of agents in a flow control system. An agent calculates values for one or more local parameters of components controlled by the agent. The agent negotiates, between the agent and connected agents of the plurality of agents, values for one or more shared parameters. The agent adjusts the values of one or more local parameters based on the negotiated values. The agent generates a local flow control plan using the adjusted values. The agent implements the local flow control plan.

In a third aspect, a device is provided for controlling an intelligent water pump in a building control system. The device includes a memory, a communications interface, and a processor. The memory is configured to store configuration data and optimization data. The communications interface is configured to communicate values for one or more shared parameters with one or more other devices. The processor is configured to calculate values for local parameters and shared parameters based on the configuration data and optimization data. The processor is configured to negotiate values for the shared parameters with the one or more other devices. The processor is configured to recalculate values of local parameters as a function of the negotiated shared parameters and to generate a flow control plan as a function of the recalculated values and the negotiated shared parameters.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION

A decentralized multi-agent control framework with a dynamic topology for a flow control system is used to plan and schedule for each agent independently without a central processor. Each agent of the multi-agent control framework separately optimizes a local portion of the system as a function of values for one or more parameters. Agents communicate with other connected agents, sharing values for parameters. The communication provides a negotiation and consensus for values of the shared parameters that are used by the agent to recalculate optimized parameters values for the local portion of the system. The combination of both local optimization and shared consensus provides for a scalable, fault tolerant, and efficient flow control system.

Figure 1A:
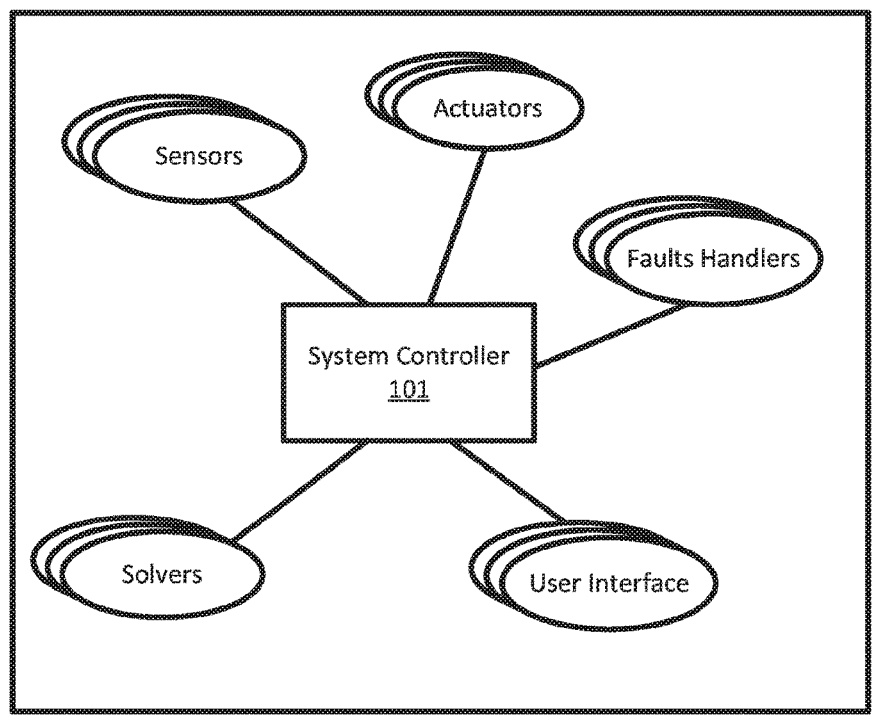
FIGS. 1A and 1B depict example flow control systems.
Figure 1B:
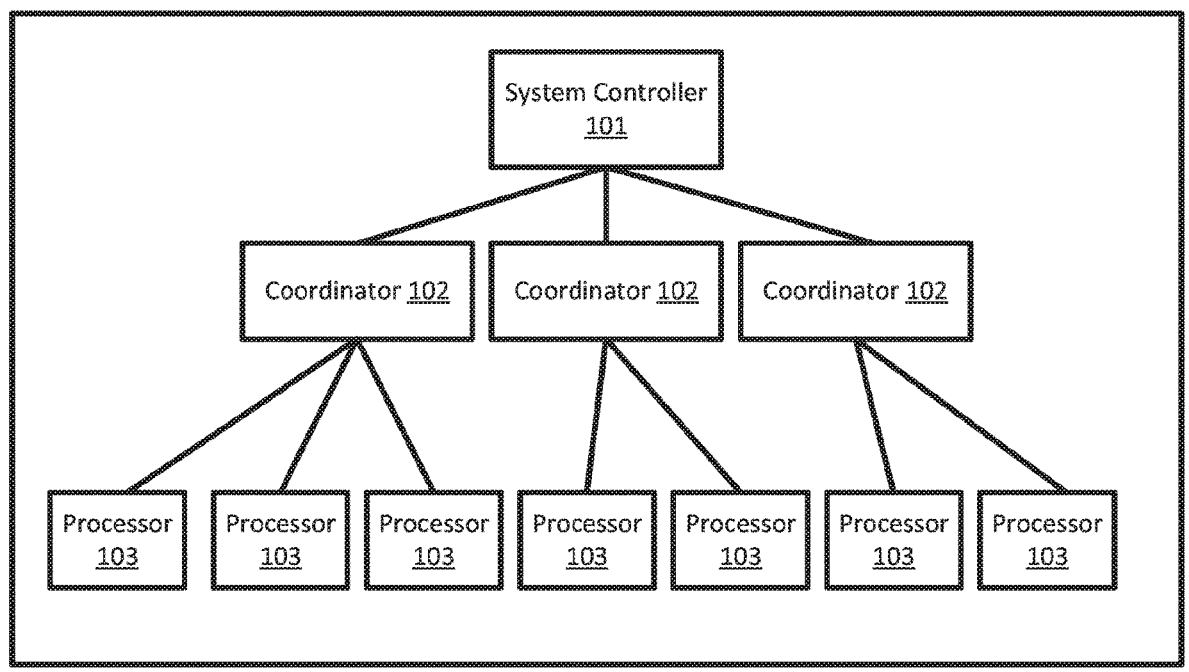

Current flow control systems may be categorized into two types: centralized or distributed. FIG. 1A depicts a centralized control system. FIG. 1B depicts a distributed control system. In FIG. 1A, the system controller 101 collects information from the sensors, actuators, fault handlers, user interface, and solvers and computes the control actions for each of the components in the system to provide optimal flow that satisfies the objectives. In FIG. 1B, a process or plant is controlled by distributed components. The components (coordinators 102 and processors 103) are distributed throughout the system, but there is central operator supervisory control 101. For example, a component coordinator 102 may provide instructions to a subordinate processor 103 for which the component coordinator 102 is connected. A central system controller 101 provides instructions to each of the component coordinators 102 that direct their subordinates. A distributed control system may include multiple centralized control systems that are controlled by another system controller 101. The hierarchy mitigates a single processor failure. If a component coordinator 102 fails, it may only affect one section of the process, as opposed to a failure of a central system controller 101 that might affect the whole process. Distributed control systems may increase reliability and reduce installation costs by localizing control functions near the end process or plant and enables monitoring and supervisory control of the process remotely.

Figure 2:
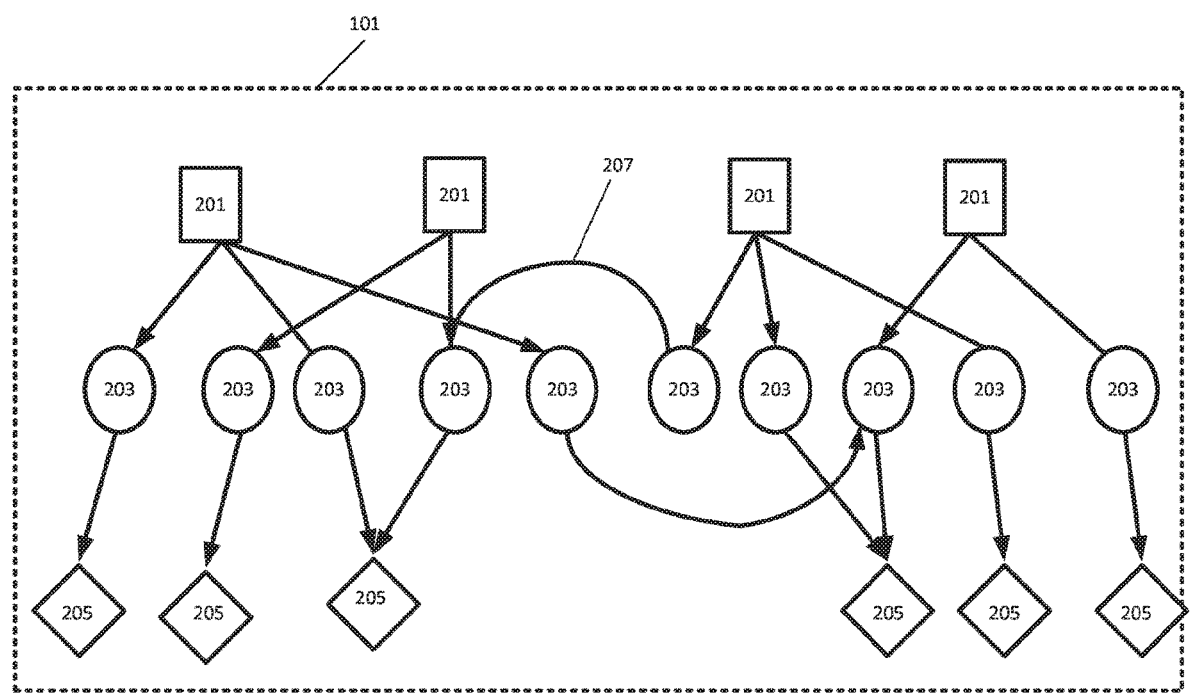
FIG. 2 depicts an example water flow control system.

FIG. 2 depicts an example flow control diagram as a graphical representation of an example water control system. FIG. 2 includes a plurality of pumps 201, a plurality of valves 203, and a plurality of loads 205. The connections between each of the components are depicted as edges 207. The system in FIG. 2, may be used, for example, in power generation modules, power distribution modules, air conditioning plants and steam condensers among others. In an example, the system in FIG. 2 may be used to distribute chilled water in a ship. The chilled water system is mainly used for compartment and equipment cooling. The chilled water comes from the chiller. The plants produce chilled water for circulation throughout the ship. Other arrangements, other parts, and/or other environments may be used.

In the example of FIG. 2, for a centralized solution, each of the devices may be control by a centralized system controller 101. A centralized control algorithm relies on the system controller 101 to collect data from all the devices and compute the optimal configuration and control actions for the actuators and send the information back to each device. In this centralized control example, additional connections exist between each component and the centralized system controller. A centralized control system may be simple to manage as all the data and decisions are made in a single location. However, centralization may not be fault tolerant. If the centralized system controller 101 goes down or is damaged, there is no fallback or ability to recover. The whole system may be at risk of a single error. Redundancy may be provided in the form of backup systems. Backup systems, however, increase the cost of the system and further may still be susceptible to faults. Additionally, communication may be centralized, e.g. each device is only configured to communicate with the centralized processor. If a line of communication is damaged, a device may have ill conditioned communication topology, referred to herein as orphan edges. Centralized systems may further have issues with sizing and distance. Time delays may complicate very large systems that are spread out over a large region.

Due to the complexity and the large size of certain networks, control of such systems may not be done in a centralized way in which a single controller operates the full network from a single location. Instead of collecting measurements from the whole system and determining actions from a single location, control is typically spread over several local control agencies, each controlling a particular part of the network.

Distributed control systems are similar to centralized control systems in that there is a centralized control structure. However, in a distributed control system, there are additional layers that provide some redundancy and may split the control system into different aspects. For example, one supervisor processor may control one type of process while another supervisor processor may control a different process. Both supervisor processors take instruction from a coordinating processor or a central processor. In another example of a distributed control system, in a large network as described above, the large network may be divided into separately operated systems. A distributed control system may be more fault tolerant than a centralized control system, but still includes many of the drawbacks. Redundancy in some communications or control devices increases costs. A distributed control system may be difficult to alter or add to. For example, adding a new device may require a total overhaul of the control system. Communication paths are further susceptible to single fault points.

In many control systems, the components or devices do not communicate with one another. When one component requires additional resources, the change is made manually by an operator. In other systems, changes are complicated and may be inefficient to implement. An engineer, for example, may be required to adjust certain components. In an example, regarding flow rate, if one component requires more load, an engineer may have to recalculate the flow rate for the entire system. After the engineer identifies the desired values based on the modeling, the engineer still needs to log in to the control system of the flow control system and change the parameter or values of the parameters for each component, which may be an inefficient process.

Embodiments include a decentralized multi-agent control system that automatically adjusts to changes to the system. In an example of a water cooling plant, the decentralized multi-agent control system divides the system into multiple agents to optimally provide cooling to the critical thermal loads, automatically detect water pipe failures, and quickly reconfigure the system to adapt for real-time failure and/or faults. The decentralized multi-agent control system includes scalable and extensible software architecture that can adapt both centralized and decentralized control architecture. The system provides a two-layer software architecture to make the system flexible and extensible. Users do not need to change the source code of the centralized optimization if they change the configuration of the chilled water network. With moderate software development effort, users may adjust or replace a current optimization solver with another one.

The decentralized multi-agent control framework provides a flexible and extensible control system. Each agent in the system has individual objectives for the local devices controlled by the individual agent. In addition, the agents are competing for shared resources in the flow system as a whole. The decentralized multi-agent control framework addresses the distributed optimization problem with cost minimization so that the decentralized multi-agent control framework maximizes the total utility of the system. A combination of model-based reasoning and agents provides an effective mechanism for autonomous control of a complex distributed system.

Many buildings are cooled by complex distributed systems such as chilled water plants. The chilled water plants produce chilled water that is pumped to air handlers to cool building air. Chillers, air handlers, and other components of a chilled water plant are configured to operate at a specific chilled water entering and leaving temperature. The flow of the chilled water may be controlled by a flow control system. Other building systems, such as heating, ventilation, and air conditioning (HVAC) systems may also use a flow control system. The operation of an air-handling unit in an HVAC system uses fan speed, pressure, power input, and flow. Flow control systems may also be used in other environments that require autonomous control of complex distributed systems.

For building clusters water supply systems, a central chiller provides chilled water to multiple buildings. Each building has pumps to pull the chilled water to its Roof Top Unit (RTU) or Air Handling Unit (AHU). Each building may be controlled by a separated building automation systems (BAS), where there are separated pressure set points for the pumps. If the set points are not coordinated, multiple buildings may compete the chilled water on the supply pipe, which result in both energy waste and comfort loss. Since all building pump set points are coupled, each time the operation point of one building is changed, it can potentially disrupt the entire building cluster. In order to avoid the problem, each time the system configuration is adjusted, engineers need to tune the pump set points. Additionally, if the set points are changed, engineers may need to tune controller parameters again, such as PID controller parameters. To avoid conflictive settings, the set points of each building should be tuned together. This process is time consuming. The state of art solution is to tune pump set points and control parameters with a centralized software. Embodiments described below provide a decentralized multi-agent control system and a distributed multi-agent control system for building cluster water supply systems. In a water supply system, the agents are embedded software module on each pump.

Figure 3:
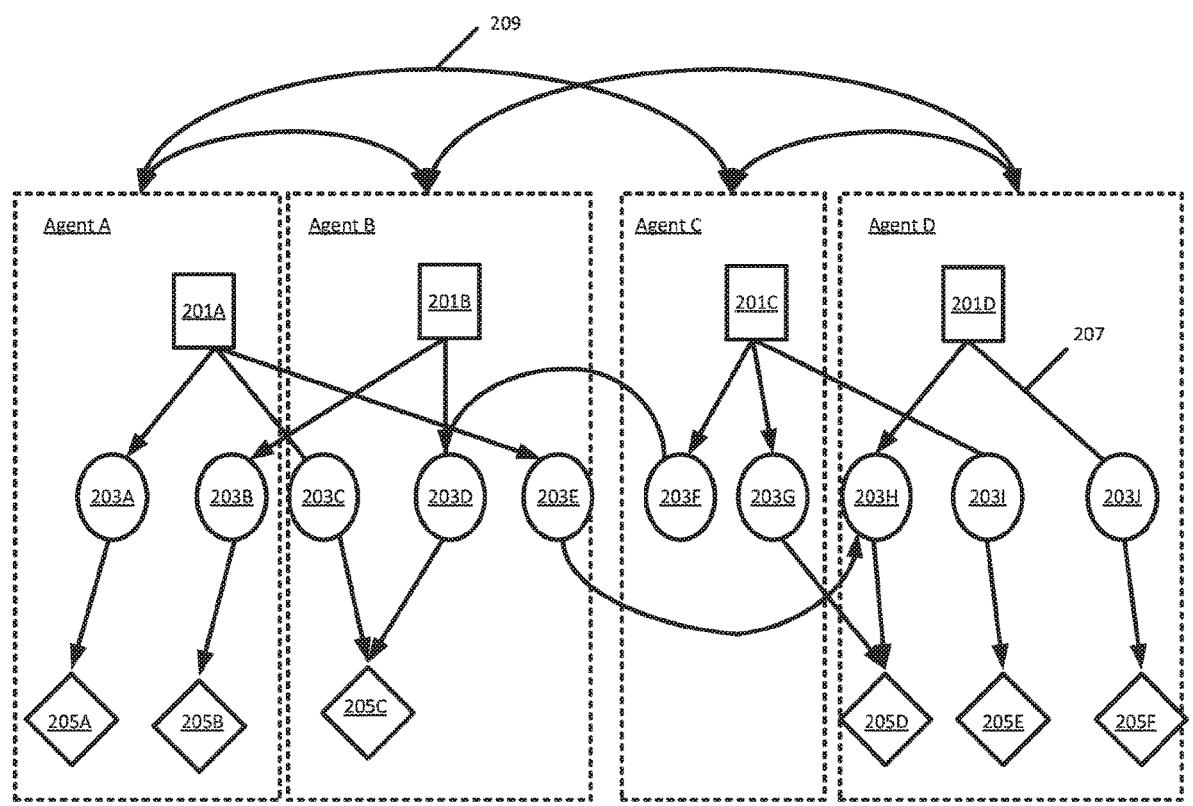
FIG. 3 depicts a multi-agent flow control system according to an embodiment.

FIG. 3 depicts an example decentralized multi-agent control system for flow control of the system of FIG. 2. The multi-agent control system includes a plurality of devices, each of which is controlled by an agent. As depicted in FIG. 2, the devices may include any mechanical, electrical, or physical device that may be used in a flow control system. For example, the devices 203 may include one or more valves 203A-203J. Each valve 203A-203J, for example may include at least one mechanical element configured to adjust one or more flows, at least one sensor configured to detect the one or more flows, and at least one actuator configured to mechanically adjust the at least one of the mechanical element. Similarly, each device 201A-D (e.g. pump) may include at least one mechanical element configured to adjust one or more flows, at least one sensor configured to detect the one or more flows, and at least one actuator configured to mechanically adjust the at least one of the mechanical element. FIG. 3, as in FIG. 2, also depicts one or more loads 205A-F to which the controlled substance (e.g., liquid or gas) is delivered.

In FIG. 3, there are four agents depicted (A, B, C, and D). In FIG. 3, each agent controls one pump 201A-D and one or more other devices (203, 205). In an embodiment, each agent may be located in or on the respective pump. The agent may be located in a panel or other processing device. Each agent in the multi-agent control system may include a processor configured to calculate a local optimized flow plan based on data from the at least one sensor, communicate the local optimized flow plan to at least one other component of the plurality of components to negotiate an optimized system flow plan, and implement the optimized system flow plan though the at least one actuator. Each agent may further include a communication interface configured to communicate with at least one other agent. An agent may control one or more of the devices in the control system. Each of the devices may be controlled by only one of the agents. In FIG. 3, for example, the agents are configured to control the devices within the respective dotted line.

Each agent may be configured in hardware or software. In an embodiment, the agent includes a microprocessor and memory located at a device in the system (e.g. located on a pump). The physical connections between the devices of the agents is depicted in FIG. 3 by the edges 207 of the diagram. The agents may communicate with one another directly or indirectly. Direct communication may be wired, wireless, or any other type of connection. Indirect communication may include communicating over the internet, a wide area network, or through cloud computing networks. In an embodiment, each agent may only communicate with other agents that include shared resources. For example, in the communication connections depicted above the agents by the lines 209, Agent A, for example, communicates with Agents B and C. Agent B communicates with Agent A and D. Agent C communicates with Agent A and D. Agent D communicates with Agent A and C. Other communications arrangements may be used, such as one agent communicating with only one other agent or communicating with all other agents.

An agent, may be intelligent, e.g. capable of adapting to different scenarios. In order to be intelligent, an agent may be configured to react to changes in its environment in a timely fashion, and take some action based on the changes and the function for which the agent is configured. An intelligent agent may further be configured to act in its own self-interest. For example, intelligent agents may exhibit goal-directed behavior. Goal-directed behavior implies that an agent may change its behavior in order to achieve its goals. For example, if an agent loses communication with another agent whose services the agent requires to fulfill the goals of the agent, the agent will search for another agent that provides the same services. In addition, intelligent agents may be configured to interact with other intelligent agents. Interaction between agents may include more than simple transmission of data between different software and hardware entities. Rather, an intelligent agent may be configured to negotiate and interact in a cooperative manner.

Each agent in the system may be configured to compute the optimal operation parameter values in parallel for the devices under the agent's control. Certain parameter values may be shared between agents. For example, two devices controlled by two different agents may share a supply. Each agent calculates parameter values for the supply independently as a function of optimizing the local environment. The agents communicate the respective optimal parameter values to their connected neighboring agents. An optimization solver algorithm may be used to calculate the parameter values for each agent. The optimization solver may also be used to negotiate a global optimized solution for the system. After the agents exchange parameter values for the shared devices, the agents again compute a local optimization using the optimization solver. The agents communicate the new optimal parameter values to their connected neighboring agents, repeating the process until the system has reached a consensus of what to do. E.g. there is an optimal distribution of resources between the agents as determined by the optimization solver and the current system status. A consensus may also be referred to as a convergence (agreement).

The exchange of data between the agents is defined by both the physical and communication networks. The communication network, e.g. electronic—wired or wireless transfer of data, of the agents may be configured to be fault tolerant and easily upgradeable. Two main drawbacks described above in a centralized solution or a distributed solution are fault tolerance and adaptability.

Each of the agents may be configured to store and execute an optimization algorithm. Each agent may be configured to solve for an optimal state for the agent, for shared parameter values with other agents, and, for example, the entirely of the system. Only a portion of the data, for example, may be made available to the agent. For example, as depicted in FIG. 3, sensors that report data to Agent B may not report data to Agent A. Agent A in the scenario of FIG. 3 may not receive data from device 203D or 203F for example. Agent A may be configured to calculate optimized parameter values for a local environment given the shared parameter values, but not the entire system as a whole. In many systems, there is a finite amount of resources at any given time. The total demands of each of the devices in the system may exceed the supply. In order to function optimally, the system allocates the resources to achieve one or more goals. The goals may include, for example, maintaining a safe operating environment, provide the most benefit to the most devices, maximize results, minimize costs etc. The goals may be input by a user and programmed into the optimization solver. The optimization solver, as such, may be configured to optimize a specific aspect of the system while maintaining other standards such as safety or comfort. To provide a global solution that functions optimally for both the local and global environments, Agent A communicates local optimized parameter values to other agents. Each agent solves using a stored optimization solver, for an optimized solution given the information that each agent possesses. After computing a local optimized solution, the agents communicate their shared values to connected agents. After a plurality of iterations, the agents may come to a consensus for the optimal state of the entire system given the input from each agent (and the shared nature of some of those inputs). The consensus or convergence is determined between the agents using one or more optimization solvers.

The optimization solvers may use different method for solving for an optimization solution. The solver may be configured to solve for different types of outcomes. For example, one solver may attempt to generate optimized results while maintaining a level of safety. Another solver may attempt to generate optimized cost savings while maintaining a certain level of operation. In an example for HVAC, certain areas may require to be kept below or above a specific temperature. Other areas may have variable standards. The solver may take into consideration each of the requirements or goals when calculating a solution. One method for solving consensus is using alternating direction method of multipliers (ADMM). ADMM is an algorithm that solves convex optimization problems by breaking them into smaller pieces, each of which are then easier to handle. ADMM may use a Lagrangian algorithm for finding a local min and max of a function that is subject to equality constraints. Methods may include augmented Lagrangian methods have also been used for distributed optimization. Augmented Lagrangian methods are a certain class of algorithms for solving constrained optimization problems. Augmented Lagrangian methods include similarities to penalty methods in that the methods replace a constrained optimization problem by a series of unconstrained problems and add a penalty term to the objective. The augmented Lagrangian method adds yet another term, designed to mimic a Lagrange multiplier.

Other methods may be used to reach consensus such as gradient and sub-gradient methods, including incremental versions. These methods may provide computational simplicity at each node and theoretical robustness guarantees. Other methods may include using solvers such as ECOS, a software package for computing solutions to conic optimization problems, GLPK (GNU Linear Programming Kit) a software package for solving large-scale linear programming (LP), mixed integer programming (MIP), and other related problems, IPOPT, a software library for large scale nonlinear optimization of continuous systems, among others.

In an embodiment, a central optimizer may be used to coordinate the optimization problem for the agents. Each agent may compute a local optimization and transmit the solution to the central optimizer. The central optimizer may identify an optimized solution for the system.

In the event of a fault, the entire system may be configured to recover due to the decentralization of the agents. If, for example, a pump 201B failed, agent B may identify the problem and adjust its parameter values. The failure of pump 201B also affects the operation of Agent A's valve 203B. If a shared pump or device failed, each agent takes the failure into account when computing a local optimization. The failure or fault may then be communicated to other agents when determining consensus. In the example of a failure at pump 201B, Agent B first optimizes the local environment, then transmits values of shared parameter values to other agents. In this scenario, Agent B would inform Agent A that there is no allocation of flow forthcoming from pump 201B. Agent A would then adjust its environment using the data from Agent B.

Each agent may be configured to detect system fault and design defects, such as an orphaned edge, by coupling both the physical network and the communication network. An orphaned edge is defined as a physical link between two agents, while the two agents are not exchanging information in the communication layer. Therefore, when an orphaned edge is present in the system, consensus and synchronization is more difficult to achieve without additional communication effort. An agent may automatically identify the existence and location of the orphan edge and reconfigure the communication system to apply a multi-hop protocol to guarantee synchronization and/or consensus and optimal operation of the system, even with the presence of an orphan edge. After the fault is detected, the agents automatically determined if the fault can be dealt with using the current system configuration. If additional orphaned edges are introduced, then the reconfiguration is conducted.

The decentralized multi-agent control system may calculate an optimized state at various intervals. For example, the decentralized multi-agent control system may automatically determine an optimized state every second, every 5 seconds, every minute, every hour, etc. The frequency of determining the optimized state may be dependent on the data collected by the sensors and the precision required by the system. For example, in a building environment, the requirements of a water system may change slower than the requirements of a power system that requires constant adjustments. For an AC system, the building temperature and water needs may be adjusted every five or ten minutes to make sure that the system is keeping up with internal and external environmental factors. In the event of a fault, the system may be reoptimized immediately.

In an embodiment, additional devices or agents may be introduced into the flow control system. Each agent may include a copy of a configuration layer that identifies frequently changed settings for the system. The frequently changed settings for the system may be stored in, for example, text files (e.g. an initialization file). Users may easily change the settings without spending the time to understand the source code of the algorithm. The configuration layer may include different kinds of settings, e.g. static and dynamic settings. Static settings may include algorithm parameters and static variables of the problem, such as variables for optimization solvers, weights for priority of components, network topological connections, etc. Dynamic settings include information about the system as measured through one or more sensors. The dynamic settings serve as an input to an optimization layer. The information includes measurements regarding pumps, pipes, valves, sinks (loads), faults, etc. The configuration layer and information included may be communicated between agents so that each agent maintains an up to date listing of static and/or dynamic parameters. To add a device or agent, the configuration layer is updated with settings for the new device or agent.

Each agent may also include an optimization layer. The optimization layer includes one or more modules for optimizing the control system. The optimization layer may include a problem formulator module that inputs the information from the configuration layer and then formulates the problem (objective function and constraints) using a math modeling language module. The math modeling language module may be an optimization library provided by a mathematical modeling language, for example CVXPY (a Python-based mathematical modeling language). The benefit for using a math modeling language is to make the system flexible to use different solvers. Because each solver has a proprietary input data format and specific problem formulation, without a math modeling language, there might be a significant software development effort to change solvers. CVXPY may serve as a compiler to transfer high-level problem formulation to solver-specific data formats. The problem may be formulated either as a Centralized or Decentralized problem. The formulated problem is then communicated to the optimizer module. The optimizer module provides access to a set of optimization solvers, for example, ECOS and GLPK solvers.

To add or remove a device, a user may change the settings in the initialization file, for example, by adding a new pump. The system may automatically adjust the optimization solver to include new inputs from the device. A new load or pump, for example, may add another parameter value for the optimization solver to solve for, but may not change the goal for the optimization solver.

Figure 4:
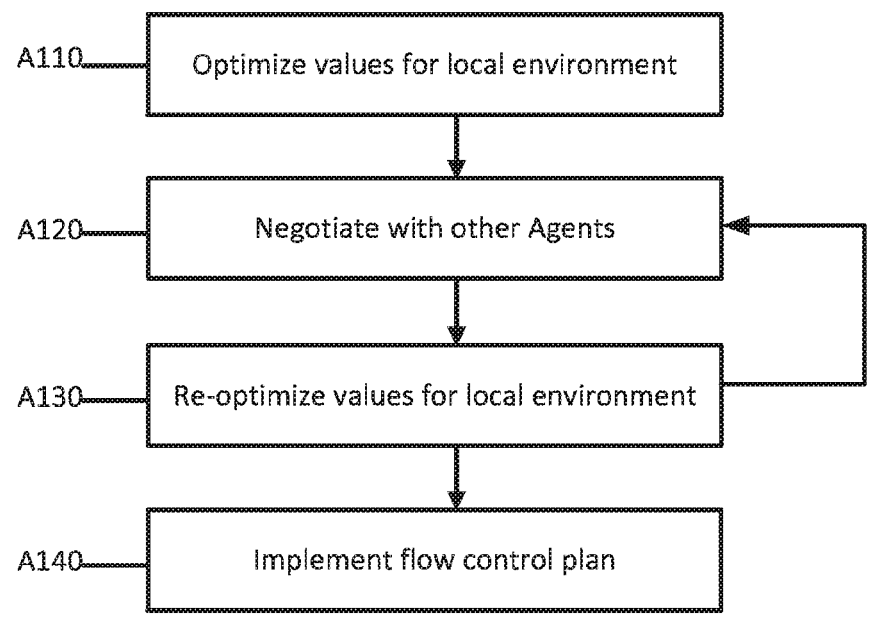
FIG. 4 depicts an example method for generating a flow control plan for a plurality of components in a flow control system according to an embodiment.

FIG. 4 depicts an example method for flow control using the decentralized multi-agent control system of FIG. 3. The acts are performed by the system of FIG. 3, FIG. 5, or other systems. Additional, different, or fewer acts may be provided. The acts are performed in the order shown (e.g., top to bottom) or other orders. The steps of workflow of FIG. 4 may be repeated. The output of the decentralized multi-agent control system, e.g. a set of parameter values or instructions may be accomplish using a parallel coordination scheme in which the following steps are performed for multiple controllers: (A110) all controllers compute their optimal parameter values in parallel or sequence, (A120) controllers communicate their optimal parameter values of interconnecting input and output variables to their neighbors, (A130) controllers update their parameter values based on received values of variables and communicate them to their neighbors. A110-A130 are repeated until convergence (agreement) is reached.

The agents of the decentralized multi-agent control framework solve a local problem, communicate their solutions with other agents, and repeat the local solution process on the basis of the new information received. The agents agree on a common solution that optimizes a certain performance criterion for the overall multi-agent system while satisfying local constraints. This distributed optimization scheme leads to computational and communication savings compared to centralized paradigms.

A local device of FIG. 3, e.g. an intelligent pump, may be configured with a local agent that controls the pump and other connected components. In alternative embodiments, an agent and/or local controller may control multiple devices or pumps.

At act A110, one or more local parameter values are optimized by an agent of a plurality of agents. The one or more local parameters may be, for example, flow rate, temperature, min water supply, max water supply, min response time, pressure, volume, among others. Inputs for calculating the values may be acquired from one or more sensors attached to the device. For example, each pump may include a flow rate sensor that measures the flow rate of the pump. Additionally, one or more devices attached to the pump may request or require a level of flow, e.g. load. An AC unit, for example, may require additional water when running in the middle of the day as opposed to the evening. The AC unit may further include one or more sensors that determine the load required (or requested). The sensor data may be transmitted to the pump processor or agent and stored in the dynamic settings. Limitations or other operational parameters are known, measured, or calculated.

Optimization of the local parameter values may be determined using one or more optimization algorithms. Any algorithm may be used to determine optimized values for the local parameters. The agent may input multiple variables received from one or more sensors. The agent may receive data for one or more requests, e.g. for a volume or flow of water. The agent may receive data for one or more supply channels, e.g. the amount of volume or flow available. The agent may also share one or more inputs or variables with other agents. For example, one source may supply two pumps, one that is controlled by a first agent and one that is controlled by a second agent. Other devices controlled by the first agent may depend on the amount of water, for example, that is allocated to the first agent as opposed to the second agent. The first agent communicates with the second agent (and other agents) to determine the allocation.

At act A120, the plurality of agents negotiates to determine an optimized shared solution given the one or more optimized local parameter values for each agent of the plurality of agents. The agents may share aspects of devices (supply, demand, etc.) with other agents. Each agent provides a request allocation for the devices under the agent's control. The allocation requests may not match up. For example, if two agents share a single supply, both agents may request 100% of the supply in order to optimize the local environment. An optimization solver stored in each agent identifies, based on the shared requests and local parameter values, an optimized solution. The optimized solution includes the new parameter values and new shared parameter values are then transmitted to connected agents.

At act A130, values for the one or more local parameters are re-optimized by the agent as a function of the optimized shared solution. Each agent computes optimal parameter values as in A110, but now also considering the interconnecting variables determined at A120 to be optimized and now using fixed values for the shared parameters. The acts of A120 and A130 may be repeated, e.g. the agent optimizes the local environment and then negotiates with other agents to identify new shared parameters that alter the local environment that is then reoptimized.

Each agent is configured to communicate to its neighbor agents a set of preferred values, according to its local viewpoint, of the interconnecting variables. For example, for a shared parameter, an agent may attempt to maximize the parameter for its own benefit. In the case of a water control system for a building, an agent may desire to attempt to maximize its own water use for an AC unit, regardless of if the request allocation is equal to other controllers (at this point, each agent operates independently in that the agents attempt to maximize the local environment without regard to the system as a whole). The initial request from an agent may not be compatible with requests from another agent as each agent attempts to maximize their own environment. The agents come together to determine a consensus of how to use the shared resources. The values for each of the shared parameters eventually are negotiated to reach a convergence where, for example, the maximum or optimal benefit is derived for the entirely of the system. A consensus may be reached, for example, when the shared parameters do not change. Certain devices or agents may be weighted more heavily, e.g. be prioritized against lessor devices when determining a consensus among agents for the use of the shared resources.

Convergence may be obtained by updating the values of the shared parameters (e.g. Lagrange multipliers when using ADMM) using the solution of the optimizations and then repeating the optimizations until the shared parameter values do not change anymore (with respect to small numerical tolerance) from one iteration to the next. Under convexity assumptions on the objective function and linearity of the subnetwork model constraints, solving the distributed control problem in such a way leads to the optimal solution of the centralized control problem that considers the entire network.

At act A140, the flow control plan is implemented by the agent with the re-optimized one or more local parameter values. Implementation may include transmitting one or more commands, set points, or instructions to devices controlled by the agent. For example, the flow control plan may allocate an amount of a resource to one device. The agent adjusts the device and any other device to allow that amount of resource to flow to the device based on the flow control plan. The flow control plan may be updated at regular interval or in the event of a fault or change to the system.

The communication network for the agents may be configured to be fault resilient. When configuring which agents control which devices and which agents communicate to other agents, orphan edges may be prohibited or designed around. An orphan edge is a physical link between two agents where these two agents are not able to exchange information in the communication layer. When an orphan edge is present in the system, consensus and synchronization is more difficult to achieve without additional communication effort. During configuration of the flow control system and the communication network, the existence and location of the orphan edge may be determined. The communication system may be reconfigured to apply a multi-hop protocol to guarantee synchronization/consensus and optimal operation of the system, even with the presence of orphan edge.

During setup or configuration of the system, information about which physical and/or communication link are important may be determined. The offline design process may be done by assuming a fault happens at each edge. A simulation may run to implement and identify the results of faults. If a fault does not introduce an additional orphan edge and does not trigger reconfiguration of the system, then the edge is not considered as an important edge. For important edges, the system may be configured to include additional communication pathways or redundancy. In this way, the configuration process may be more efficient and provide a more robust system.

Additionally, during setup or configuration, a resilience metric calculation method may be used to compute a resilience metric for a use case. For example, for a ship where a cooling system provides cooling to thermal loads during abnormal (fault, damage, etc.) events, the ship's resilience is quantified in the form of a numerical metric and used in an objective formulation during the reconfiguration process to identify communication paths. The system is more resilient to failure and instability both in the physical and communication system, resulting in less maintenance cost.

During operation if a fault is detected, the control system may automatically determine if the fault may be dealt with using the current system configuration. If an additional orphan edge is introduced, then the system may reconfigure the communication network. Base on the performance evaluation of the overall system resiliency, each agent may adapt the control action to maintain the stability margin. Together with fault detection function, the cost of the system is reduced, because the number of emergency backup device may be reduced, and the security monitoring system may also run at a much slower time horizon.

Figure 5:
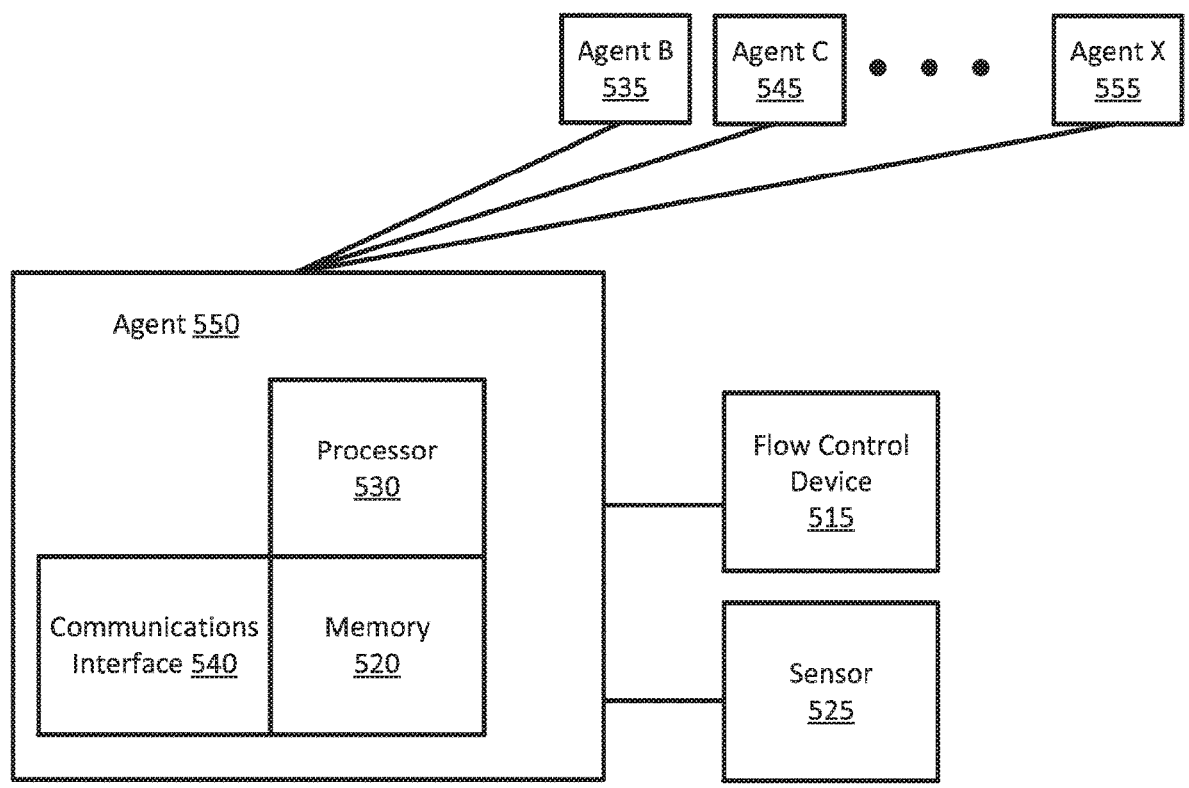
FIG. 5 depicts a system for generating a flow control plan for a plurality of components in a flow control system according to an embodiment.

FIG. 5 depicts one embodiment of an agent in a decentralized multi-agent control system. The system includes a plurality of agents (Agent 550, Agent B 535, Agent C 545, . . . Agent X 555), a flow control device 515 and a sensor 525. The agent 550 is a processor 530, a memory 520, and a communications interface 540. Additional, different, or fewer components may be provided. For example, other devices may be attached or controlled by the agent 550. Each of the plurality of agents may maintain physical and communicative connections to one another and other devices. Other inputs may be provided such as sensors for gathering environmental data. A workstation with a user interface may be provided for an operator to input data.

The flow control device 515 may be a pump. The sensor 525 may be configured to acquire information from the flow control device 515 or other devices in the system. The agent 550 is configured to control the operation of the flow control device 515. The agent 550 may receive input data from the flow control device 515, the sensor 525, or other agents. The agent 550 may further receive input from a user interface, for example, by an operator or engineer.

The memory 520 may be a graphics processing memory, a video random access memory, a random-access memory, system memory, cache memory, hard drive, optical media, magnetic media, flash drive, buffer, database, combinations thereof, or other now known or later developed memory device for storing data. The memory 520 is part of the server 550, part of a computer associated with the processor 530, part of a database, part of another system, or a standalone device. The memory 520 may store configuration data and optimization data for the agent 550. The memory 520 may store an instruction set or computer code configured to implement a solver algorithm.

The memory 520 may store a copy of a configuration layer that identifies frequently changed settings for the system. The frequently changed settings for the system may be stored in, for example, text files (e.g. an initialization file). Users may easily change the settings without spending the time to understand the source code of the algorithm. The configuration layer may include kinds of settings, static and dynamic. Static settings include algorithm parameters and static variables of the problem, such as the option of solvers, network topological connections, component weights, etc. Dynamic settings include information about the system as measured through one or more sensors. The dynamic settings serve as an input to an optimization layer. The information includes measurements regarding pumps, pipes, valves, sinks (loads), faults, etc. The configuration layer and information included may be communicated between agents so that each agent 550 maintains an up to date listing of static and/or dynamic parameters values.

To add or remove a device, a user may change the settings in the initialization file, for example, by adding a new pump. The agent 550 may automatically adjust the optimization algorithm that pulls data including data regarding the new pump and as such, the system remains stable.

The memory 520 or other memory is alternatively or additionally a non-transitory computer readable storage medium storing data representing instructions executable by the programmed processor 530 for optimizing one or more values of parameters in the system. The instructions for implementing the processes, methods and/or techniques discussed herein are provided on non-transitory computer-readable storage media or memories, such as a cache, buffer, RAM, removable media, hard drive, or other computer readable storage media. Non-transitory computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code, and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The processor 530 may be configured to calculate values for local parameters and shared parameters based on the configuration data and optimization data. The processor may be further configured to negotiate values for the shared parameters with the one or more other agents. The processor is configured to recalculate values of local parameters as a function of the negotiated shared parameters. The processor is configured to generate a flow control plan as a function of the recalculated values and the negotiated shared parameters. The processor 530 may include one or more modules for optimizing the control system. The optimization modules may include a problem formulator module that inputs the information from the configuration layer store in memory 520 and formulates the problem (objective function and constraints) using a math modeling language module. The math modeling language module may be an optimization library provided by a mathematical modeling language, for example CVXPY. The problem may be formulated either as a centralized or decentralized problem. The formulated problem is then communicated to the optimizer module. The optimizer module provides access to a set of optimization solvers, for example, ECOS and GLPK solvers.

The processor 530 is a general processor, central processing unit, control processor, graphics processor, digital signal processor, three-dimensional rendering processor, image processor, application specific integrated circuit, field programmable gate array, digital circuit, analog circuit, combinations thereof, or other now known or later developed device for generating a flow control plan. The processor 530 is a single device or multiple devices operating in serial, parallel, or separately. The processor 530 may be a microprocessor located in or near a pump or component in a flow control system. The processor 530 is configured by instructions, design, hardware, and/or software to perform the acts discussed herein.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A decentralized multi-agent flow control system comprising:
   a plurality of agents;
   a plurality of components for carrying out local flow control tasks for flow of liquid or gas, wherein each of the plurality of components is controlled by an agent of the plurality of agents and comprises:
      at least one mechanical element configured to adjust one or more flows;
      at least one sensor configured to detect the one or more flows;
      at least one actuator configured to mechanically adjust the at least one of the mechanical element;
   wherein each agent comprises:
      a communication interface configured to communicate with at least one other component of the plurality of components; and
      a processor of the agent configured to calculate a local optimized flow plan based on data from the at least one sensor, communicate the local optimized flow plan to at least one other component of the plurality of components to negotiate an optimized system flow plan with the other component of the plurality of components by performing a consensus function, and implement the optimized system flow plan through the at least one actuator,
   wherein each agent is configured to communicate with other agents,
   wherein each agent is configured to compute optimal operation parameter values in parallel for the one or more components under the agent control,
   wherein certain parameter values are shared between agents, and
   wherein each of the agent is configured to store and execute an optimization algorithm and to solve for an optimal state for the agent and for the shares parameter values with other agents.

2. The decentralized flow control system of claim 1, wherein the flow control system is a building water system.

3. The decentralized flow control system of claim 2, wherein the mechanical element is a pump.

4. The decentralized flow control system of claim 1, further comprising:
a component memory configured to store initialization data comprising one or more values for operation of the flow control system.

5. The decentralized flow control system of claim 4, wherein the component processor calculates a local optimized flow using the initialization data.

6. The decentralized flow control system of claim 1, wherein the consensus function comprises an alternating direction method of multipliers method.

7. The decentralized flow control system of claim 1, wherein the consensus function comprises an augmented Lagrangian method.

8. The decentralized flow control system of claim 1, wherein after a fault is detected, the component processor calculates a new optimized flow plan taking into consideration the fault.

9. A method for generating a flow control plan by a plurality of agents in a decentralized multi-agent flow control system, the method comprises:
calculating, by an agent of the plurality of agents, values for one or more local parameters of components controlled by the agent, wherein the agent of the plurality of agents controls a plurality of components of the flow control system and each component of the flow control system is controlled by one agent of the plurality of agents;
negotiating, between the agent and connected agents of the plurality of agents, values for one or more shared parameters, wherein negotiating comprises determining consensus for the values of the one or more shared parameters;
adjusting, by the agent, the values of one or more local parameters based on the negotiated values;
generating, by the agent, a local flow control plan using the adjusted values; and
implementing, by the agent, the local flow control plan.

10. The method of claim 9, wherein the local parameters comprise at least a flow rate and temperature.

11. The method of claim 9, wherein said consensus determination comprises using an augmented Lagrangian method.

12. The method of claim 9, wherein negotiating is repeated until a consensus between the plurality of agents is determined for the values of the one or more shared parameters.

13. The method of claim 9, further comprising:
detecting a fault of a component controlled by the agent;
calculating, by the agent, updated values for the one or more local parameters of components controlled by the agent as a function of the fault;
negotiating, between connected agents of the plurality of agents, updated values for one or more shared parameters;
adjusting the updated values of one or more local parameters based on the negotiated values;
generating a local flow control plan using the updated adjusted values; and
implementing the local flow control plan.

* * * * *